United States Patent Office 3,499,666
Patented Mar. 10, 1970

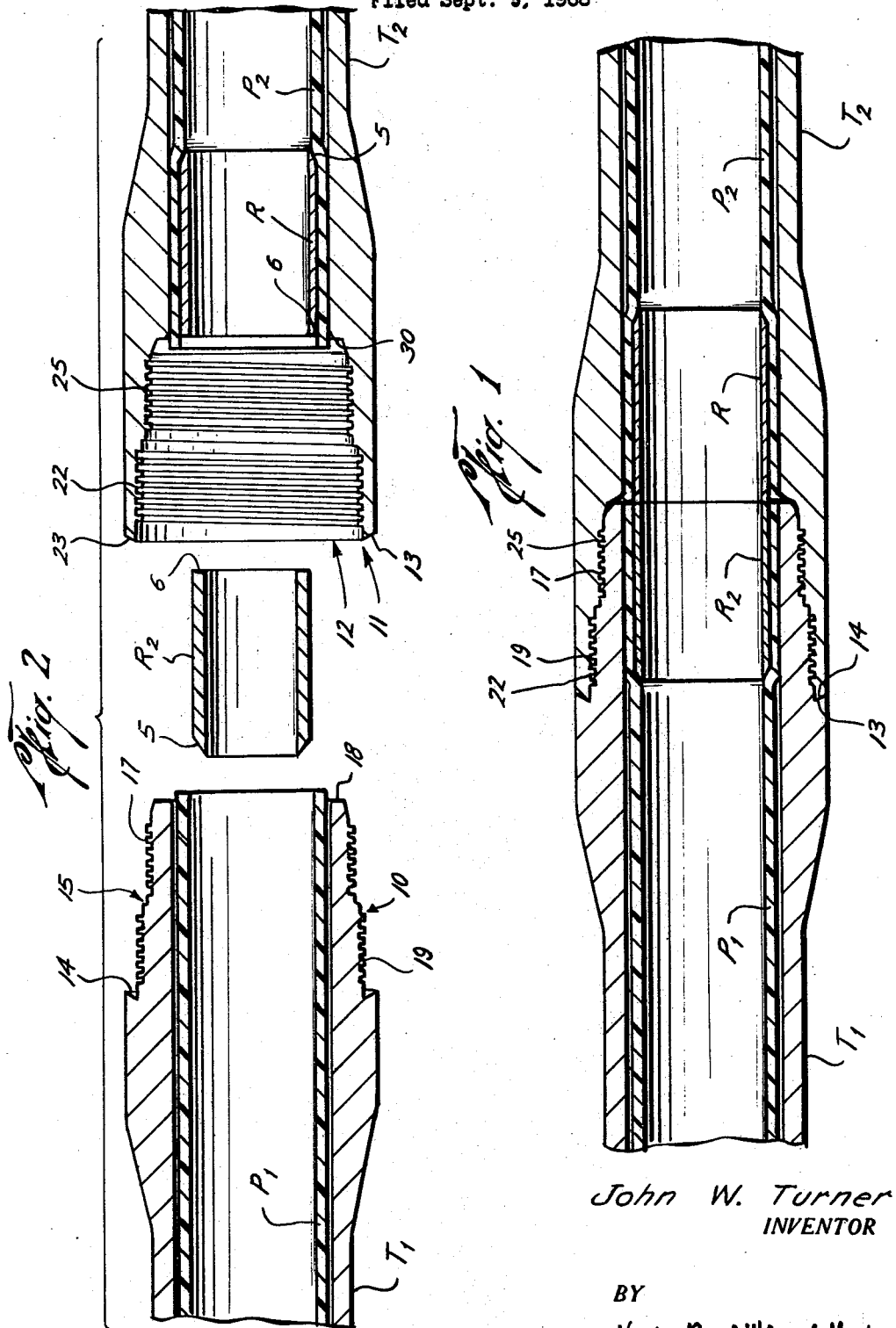

---

3,499,666
SEAL ARRANGEMENT FOR LINED
TUBULAR MEMBERS
John W. Turner, 4 W. Court Drive,
Houston, Tex. 77017
Filed Sept. 5, 1968, Ser. No. 757,582
Int. Cl. F16l 9/14
U.S. Cl. 285—55         1 Claim

ABSTRACT OF THE DISCLOSURE

A seal arrangement for a pair of lengths of pipe each length of pipe having an enlarged end portion forming a female socket on one pipe end and a male fitting at its other end, whereby the pair of lengths of pipe may be joined together and including a plastic tubular lining therein with a metallic insert adjacent each pipe end which is expanded and deformed to seal the plastic lining within the pipe. Both of the plastic linings extend beyond the metal ring which holds it in place approximately $\frac{1}{32}$ to about $\frac{1}{8}$ of an inch so that when the fitting of one length of pipe is positioned within the socket of the other length of pipe, the extending plastic is deformed to fill any voids between the socket and fitting of the pair of pipe lengths and form a fluid seal therebetween. The fitting on one end of each length of pipe and the socket on the other end of each length of pipe is provided with a particular thread configuration.

---

CROSS-REFERENCES TO RELATED APPLICATION

The present invention relates to a form of seal for a different pipe threaded arrangement, but relates generally to the subject matter disclosed in my prior co-pending application filed on July 3, 1968 bearing Ser. No. 742,383, for "Coupling Seal for Lined Tubular Arrangement."

BACKGROUND OF THE INVENTION

Field of the invention

The present invention relates to a seal arrangement between connected pipe ends wherein one of the pipe ends form a fitting and the other forms a socket, each pipe length being lined with plastic and such plastic being retained in position by a metal ring and each fitting and socket having a particular thread configuration.

Description of the prior art

As known to applicant, the prior art is represented by the patent to J.H. Millar, No. 2,550,583 issued on Apr. 24, 1951; the patent to A. J. Scholtes, No. 2,228,018 issued on Jan. 4, 1941; and the patent to J. M. Taylor et al., No. 3,298,716 issued on Jan. 17, 1967.

All of the prior art above listed does not relate to joining similarly configured lengths of pipes together with the exception of Taylor et al., and the present invention is designed to inhibit eddy currents or disturbance where pipe ends are connected together and at the same time form a fluid tight seal in a plastic lined tubular member in a simple, economical manner. It is particularly designed for use with tubular pipe lengths having a "hydril" thread formed thereon, and which are joined together by a socket formed at one end of one metal pipe length and a socket for receiving the fitting therein for joining the pipe length together.

SUMMARY OF THE INVENTION

One advantage of the present invention is that it provides a simple arrangement for providing a fluid tight seal between a male fitting on one end of the length of pipe and a female socket on the end of an adjacent length of pipe by extending a tubular plastic lining which is retained within each of the lengths of pipe by a metal ring slightly beyond both of the metal rings so that when the fitting and the socket are screwed together, the plastic is deformed and fills any gaps existing between the ends of the pipe to provide a fluid tight arrangement.

Another advantage of the present invention is that in addition to providing a relatively simple arrangement for retaining tubular lengths of plastic within tubular lengths of metal pipe is that at the time of positioning the plastic tubular member within the metallic tubular member, it can be arranged and secured within the pipe so that it protrudes a proper amount to be deformed and form a seal when adjacent pipe ends are connected together.

BRIEF DESCRIPTION OF THE DRAWINGS

FIG. 1 is a sectional, partially exploded view showing the seal arrangement and the fitting of one end of one pipe length joined in the socket of another pipe length and abutted in final position with the protruding plastic deformed and filling all voids and gaps to inhibit any leakage therefrom;

FIG. 2 is a sectional view showing the enlarged end of adjacent pipe lengths with the metal ring prior to insertion in the fitting and the metal ring positioned within the socket for engagement with the plastic tubular member with the plastic tubular member protruding slightly beyond the ends of each metal ring to provide the seal arrangement when the fitting and socket are joined together as shown in FIG. 1.

DESCRIPTION OF THE PREFERRED EMBODIMENT

Attention is first directed to FIG. 2 of the drawing which is a partially exploded, sectional view as previously mentioned. A pair of lengths of pipe or metal tubular members are shown at $T_1$ and $T_2$. A pair of inner tubular plastic lengths of pipe for fitting within $T_1$ and $T_2$ are shown at $P_1$ and $P_2$ respectively and are intended to extend throughout the longitudinal extent of the outer metallic lengths of pipe $P_1$ and $P_2$ respectively.

As more clearly seen in FIG. 2 on the right hand side, the plastic length of pipe $P_2$ is retained in position within the metal length of pipe $T_2$ by a metal ring preferably formed of stainless steel and designated R. One end thereof is tapered as shown at 5 so that when the metal ring R is inserted within the plastic tubular member $P_2$ and expanded to a seating and sealing position therein, the inner diameter of the expanded ring R is substantially the diameter of the plastic tubular member $P_2$ thereby providing an arrangement which does not create any eddy currents or turbulence in the flow of fluids through the plastic lined metal pipe.

It will be noted as shown in FIG. 2, the plastic tubular members $P_1$ and $P_2$ are shown as extending axially beyond the end 6 of each ring R and $R_2$ respectively for approximately a distance of $\frac{1}{32}$ to $\frac{1}{8}$ of an inch or thereabouts. The ring $R_2$ is shown in its position prior to insertion in the pipe $P_1$ and is tapered as illustrated at 6 to aid insertion in the plastic pipe $P_1$ and when expanded assumes the position as shown in FIG. 1 of the drawings.

Each end of each pair of lengths of pipe is enlarged and the one enlarged end of the length of pipe is formed to provide a socket designated generally by the numeral 11. It will be noted that the socket formed on one end of each of the pipe lengths is provided with a threaded area referred to generally by the numeral 12 and a rearwardly extending circumferential end portion which is tapered as shown at 13 which is adapted to be received within the circumferential undercut 14 on the enlarged end which forms the fitting 10 which is also provided with a threaded area referred to generally by the numeral 15.

The male fitting 10 has a first threaded area as shown at 17 which is adjacent and nearest the end 18 of the metal length of pipe $T_1$ and adjacent the termination of the threaded area or portion 17 is a second threaded area 19, the second threaded area being on a larger diameter of the enlarged end than is the adjacent portion 17. This arrangement provides a stepped threaded arrangement, which is provided by the fact that the threaded portion 17 is on a smaller diameter than the threaded portion 19 as shown in FIG. 2 of the drawing.

The female socket has a first threaded area 22 adjacent and nearest the tapered end 13 of the length of pipe $T_2$ for threadedly engaging with the second threaded area 19 on the fitting 10 of the metal length of pipe $T_1$. A second threaded area 25 is provided adjacent the first threaded area 22 in the female socket and is on a smaller internal diameter so as to threadedly fit and engage the threaded portion 17 of the fitting 10 when the fitting and socket are threadedly connected together. It will be noted that the threaded section 22 is on a larger internal diameter than the threaded portion 25 within the socket to thereby form a conforming stepped threaded area within the socket which receives the stepped threaded area formed in the fitting on one of the pairs of lengths of pipe.

As previously noted, both of the lengths of plastic tubular members $P_1$ or $P_2$, are extended circumferentially beyond their respective retaining ring so that when the socket and fitting are threadedly connected together as shown in FIG. 1, the plastic will be deformed and flow into and fill any voids or gaps in the joint and thereby provide a fluid tight seal. As shown in FIG. 1 the threaded areas 25 and 17 are joined together and the tapered areas 19 and 22 are connected together when the socket and the fitting are threadedly connected together. Similarly the rearwardly extending circumferentially tapered end 13 on the socket is received within the undercut portion 14 formed on the fitting as shown in FIG. 2 of the drawings to aid in retaining the socket and fitting threadedly connected together.

As the socket and fitting are threaded together, the overhanging plastic will be deformed as the pipe end 18 moves toward abutting position with the shoulder 30 formed within the socket and surrounding the portion of plastic which extends beyond the metal ring R. When this occurs, the portion of axially extending plastic will be deformed outwardly and into any space or void within the fitting or gap to form a fluid tight seal. The opposite end of each of the metal rings is substantially perpendicular to the longitudinal axis of the sleeves to aid in deforming the plastic to fill all gaps when the pipe ends are screwed together.

The foregoing disclosure and description of the invention is illustrative and explanatory thereof and various changes in the size, shape, and materials, as well as in the details of the illustrated construction, may be made without departing from the spirit of the invention.

I claim:
1. A sealed tubular arrangement for conducting fluids comprising:
   (a) a pair of outer metallic lengths of pipe;
   (b) a pair of inner tubular plastic lengths of pipe, one each fitting respectively within one of said outer lengths of pipe for conducting fluids therethrough;
   (c) means for securing said inner tubular plastic pipe at each of its ends to said surrounding metallic pipe, said means including an annular metal sleeve fitting in each of the ends of the plastic pipe holding and sealingly securing said plastic pipe against the metallic pipe to inhibit leakage therebetween;
   (d) said sleeves each having one end that is tapered on its outer circumference to aid in positioning each of said sleeves within said plastic pipe and which also aids in providing a uniform, uninterrupted surface with the plastic pipe when it is expanded into sealing position against the outer metallic pipe;
   (e) said sleeves each having their other end substantially perpendicular to the longitudinal axis of said sleeve;
   (f) each of said pair of metallic lengths of pipe having enlarged end portions;
   (g) said enlarged end portions on each one of said metallic lengths of pipe forming respectively at one end of said pipe a female socket, and at its other end a male fitting;
   (h) said female socket of one of said pair of metallic lengths of pipe having a threaded portion and an annular circumferential rearwardly tapered end;
   (i) said male fitting having a threaded portion and a circumferential undercut to fit over said rearwardly tapered circumferential end of said female socket;
   (j) said male fitting having a first threaded area adjacent and nearest the end of said metallic length of pipe, and a second threaded area adjacent the termination of said first threaded area;
   (k) said second threaded area on said male fitting extending radially outwardly throughout its extent a greater distance than said first threaded area;
   (l) said female socket having a first threaded area adjacent and nearest the end of said metallic length of pipe for threadedly engaging with said second threaded area on said male fitting, and a second threaded area adjacent the termination of said first threaded area in said socket;
   (m) said second threaded area in said socket extending radially inwardly throughout its extent a greater distance than said first threaded area, for threadedly engaging with the first threaded area on said fitting when said fitting and socket are connected;
   (n) both of said pair of tubular plastic lengths of pipe extending axially beyond said sleeve approximately $\frac{1}{32}''$ to about $\frac{1}{8}''$ so that when said fitting of one length of metallic pipe is connected with said socket of said other length of pipe said extending plastic lengths of pipe engage each other and are deformed to fill any gaps and voids between said joined pipe lengths, and said other ends of said sleeves are in substantially abutting engagement with each other.

References Cited

UNITED STATES PATENTS

| | | | |
|---|---|---|---|
| 570,169 | 10/1896 | Greenfield | 285—55 X |
| 1,838,313 | 12/1931 | Kohr | 285—258 X |
| 2,046,114 | 6/1936 | Goodall | 285—55 |
| 3,100,656 | 8/1963 | MacArthur | 285—55 |
| 3,142,499 | 7/1964 | Lang | 285—55 |
| 3,192,612 | 7/1965 | Elliott et al. | 285—55 X |
| 3,298,716 | 1/1967 | Taylor et al. | 285—55 |

FOREIGN PATENTS

| | | |
|---|---|---|
| 149,232 | 12/1952 | Australia. |
| 987,126 | 3/1965 | Great Britain. |

DAVID J. WILLIAMOWSKY, Primary Examiner

DAVE W. AROLA, Assistant Examiner

U.S. Cl. X.R.

285—258